(12) United States Patent
Yeom et al.

(10) Patent No.: US 11,338,847 B2
(45) Date of Patent: May 24, 2022

(54) STEER BY WIRE TYPE STEERING APPARATUS

(71) Applicant: MANDO CORPORATION, Gyeonggi-do (KR)

(72) Inventors: Seulki Yeom, Seoul (KR); Jung Sik Park, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 7 days.

(21) Appl. No.: 16/593,946

(22) Filed: Oct. 4, 2019

(65) Prior Publication Data

US 2020/0108860 A1 Apr. 9, 2020

(30) Foreign Application Priority Data

Oct. 5, 2018 (KR) .................. 10-2018-0118981

(51) Int. Cl.
*B62D 5/04* (2006.01)

(52) U.S. Cl.
CPC ......... *B62D 5/0484* (2013.01); *B62D 5/0463* (2013.01); *B62D 5/0472* (2013.01)

(58) Field of Classification Search
CPC ... B62D 5/0484; B62D 5/0463; B62D 5/0472
See application file for complete search history.

(56) References Cited

U.S. PATENT DOCUMENTS

| 2017/0210411 A1* | 7/2017 | Kogure | ................ B62D 5/0403 |
| 2019/0202492 A1* | 7/2019 | Niwa | ..................... B62D 5/006 |
| 2020/0039576 A1* | 2/2020 | Shoji | ...................... B62D 6/002 |

FOREIGN PATENT DOCUMENTS

| JP | 2006-315658 | | 11/2006 | | |
| JP | 2006315658 A | * | 11/2006 | ............... | B62D 6/00 |
| JP | 2012-121544 | | 6/2012 | | |
| KR | 10-2011-0075150 | | 7/2011 | | |
| KR | 20110075150 A | * | 7/2011 | ............... | B62D 1/16 |
| KR | 10-1229126 | | 2/2013 | | |

OTHER PUBLICATIONS

Machine translation of KR20110075150, Jul. 2011 (Year: 2011).*
Machine translation of JP2006315658, Nov. 2006 (Year: 2006).*
Office Action dated Oct. 8, 2019 for Korean Patent Application No. 10-2018-0118981 and its English machine translation by Google Translate.

* cited by examiner

*Primary Examiner* — Nicholas Kiswanto
*Assistant Examiner* — Mohamad O El Sayah
(74) *Attorney, Agent, or Firm* — Ladas & Parry, LLP (57) ABSTRACT

Disclosed is a steer-by-wire steering apparatus. The steer-by-wire steering apparatus includes a locking portion configured to restrict rotation of a shaft which transfers a steering force or a steering reaction in certain conditions, an actuator which generates torque capable of overcoming a rotation-restricted state of the shaft, and a control portion which determines whether the rotation of the shaft is restricted by a malfunction of the locking portion even though the rotation of the shaft does not correspond to the certain conditions and controls the actuator to generate and provide the torque capable of overcoming the rotation-restricted state of the shaft to the shaft when it is determined that the restriction is caused by the malfunction.

6 Claims, 5 Drawing Sheets

STEER BY WIRE TYPE STEERING APPARATUS

CROSS-REFERENCE TO RELATED APPLICATION

This application claims priority to and the benefit of Korean Patent Application No. 10-2018-0118981, filed on Oct. 5, 2018, the disclosure of which is incorporated herein by reference in its entirety.

BACKGROUND

1. Field of the Invention

The present disclosure relates to a steer-by-wire steering apparatus.

2. Discussion of Related Art

Steer-by-wire steering apparatuses are apparatuses which steer wheels using an electronic control unit and a motor according to an input of a sensor without mechanical connections, such as a universal joint and the like, between a steering wheel and the wheels. Steer-by-wire steering apparatuses may omit complicated components of conventional hydraulic steering apparatuses and allow a function of varying a steering ratio depending on a driving situation such as a speed and the like so as to improve driver's convenience and vehicular stability.

Generally, steer-by-wire steering apparatuses include a steering reaction portion and a wheel steering portion. While a steering wheel and wheels are mechanically disconnected, an electronic control unit receives an electrical signal of a steering angle of the steering wheel and drives the wheel steering portion so as to perform steering of wheels. The steering reaction portion generates an adequate reaction under the control of the electronic control unit so as to allow a driver to feel natural steering sense.

Conventional steer-by-wire steering apparatuses each have a component of restricting rotation of a shaft which transfers a steering force or a steering reaction to restrict rotation of the steering wheel in certain conditions such as a state in which a car stalls, a state in which something is stuck under a wheel, and the like. The above method is effective for mechanically restricting rotation of a steering wheel. However, when a malfunction occurs while driving when a car engine is on, a steering wheel is fixed and it is impossible for a driver to perform steering such that a fatal problem is caused to safety.

RELATED ART DOCUMENT

[Patent Document]
Korean Patent Registration No. 10-1229126 titled "Steering control system of steer-by-wire system" published on Feb. 1, 2013

SUMMARY OF THE INVENTION

The present disclosure is directed to providing a steer-by-wire steering apparatus in which a steering-disabled state does not occur when rotation of a shaft transferring a steering force or a steering reaction is restricted by a malfunction of a locking portion.

Aspects of the present disclosure are not limited thereto, and other unstated aspects thereof will be clearly understood by those skilled in the art from the following description.

According to an aspect of the present disclosure, there is provided a steer-by-wire steering apparatus of a vehicle. The steer-by-wire steering apparatus includes a locking portion configured to restrict rotation of a shaft which transfers a steering force or a steering reaction in certain conditions, an actuator generating torque capable of overcoming a rotation-restricted state of the shaft, and a control portion determining whether the rotation of the shaft is restricted by a malfunction of the locking portion even though the rotation of the shaft does not correspond to the certain conditions and controls the actuator to generate and provide the torque capable of overcoming the rotation-restricted state of the shaft to the shaft when it is determined that the restriction is caused by the malfunction.

The locking portion may include a locking ring including a locking groove on an outer circumferential surface thereof and disposed on the shaft, a locking unit including a locking bar inserted into the locking groove and configured to restrict the rotation of the shaft in certain conditions, and a fastening unit disposed between the shaft and the locking ring and configured to provide a fastening force between the locking ring and the shaft.

The locking unit may further include a solenoid coupled with the locking bar and inserting or withdrawing the locking bar into or from the locking groove.

The fastening unit may be formed as an elastic member disposed between an outer circumferential surface of the shaft and an inner circumferential surface of the locking ring.

The fastening unit may have a ring shape.

The actuator may generate and provide a steering reaction to the shaft while the vehicle is running.

The shaft may be a worm shaft configured to transfer a steering reaction to a worm wheel coupled to a steering shaft.

The actuator may be coupled with the worm shaft and may generate and provide a steering reaction to the worm shaft while the vehicle is running.

The shaft may be a steering shaft.

The actuator may be coupled with a worm shaft transferring a steering reaction to a worm wheel coupled to the steering shaft and may generate and provide the steering reaction to the worm shaft while the vehicle is running.

The actuator may be coupled with the steering shaft and may generate and provide a steering reaction to the steering shaft while the vehicle is running.

The shaft may be a driving pulley shaft to which a driving pulley transferring a steering reaction to a driven pulley coupled to a steering shaft through a belt is coupled.

The actuator may be coupled with the driving pulley shaft and may generate and provide a steering reaction to the driving pulley shaft while the vehicle is running.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The present disclosure may be applied with various changes, and may be included with various exemplary embodiments, and particular exemplary embodiments will be exemplified by drawings and explained in the Detailed Description. However, the present disclosure will not be limited to the particular exemplary embodiments, and the described aspect is intended to embrace all such alterations, modifications, and variations that fall within the scope and novel idea of the present disclosure.

Accordingly, in some embodiments, well-known processes, well-known device structures and well-known techniques are not illustrated in detail to avoid unclear interpretation of the present disclosure.

Hereinafter, exemplary embodiments of the present disclosure will be described in detail with reference to the accompanying drawings.

Figure 1:
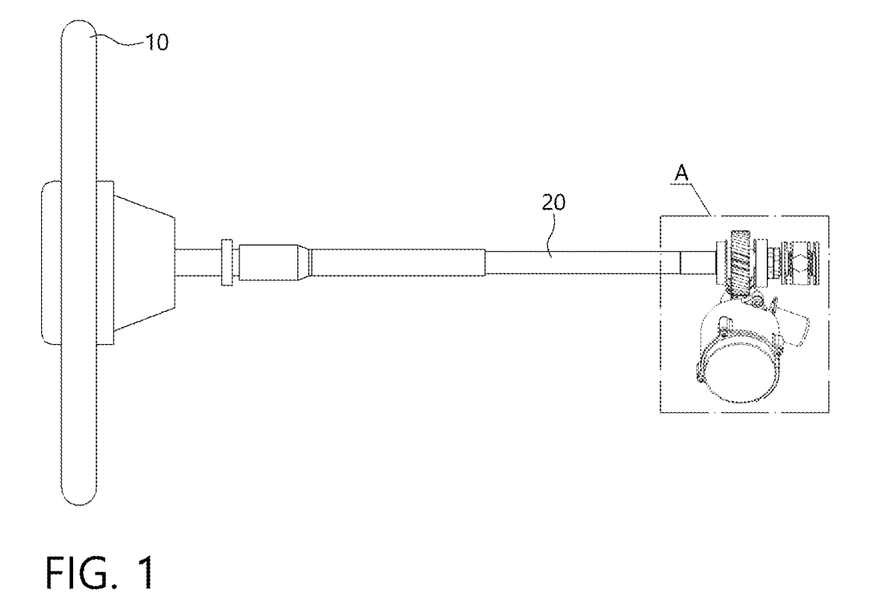
FIG. 1 is a view of a steer-by-wire steering apparatus according to a first embodiment of the present disclosure.
Figure 2:
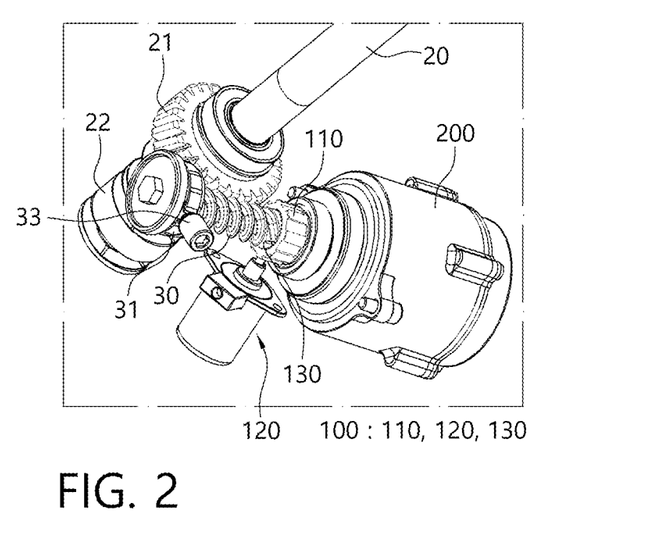
FIG. 2 is an enlarged perspective view of part A of FIG. 1.

FIG. 1 is a view of a steer-by-wire steering apparatus according to a first embodiment of the present disclosure, and FIG. 2 is an enlarged perspective view of part A of FIG. 1. Also, FIG. 3 is an exploded perspective view illustrating a worm shaft, a locking portion, and an actuator of the steer-by-wire steering apparatus according to the first embodiment of the present disclosure.

In a steer-by-wire steering apparatus of a vehicle, a steering shaft 20 connected to a steering wheel 10 rotates according to operating of the steering wheel 10 and an adequate steering reaction is provided to the steering shaft 20 under the control of an electronic control unit (not shown) on the basis of a steering angle, steering torque, and the like of the steering wheel 10. Meanwhile, a wheel steering portion (not shown) which is not mechanically connected to the steering shaft 20 performs steering of wheels under the control of the electronic control unit.

Figure 3:
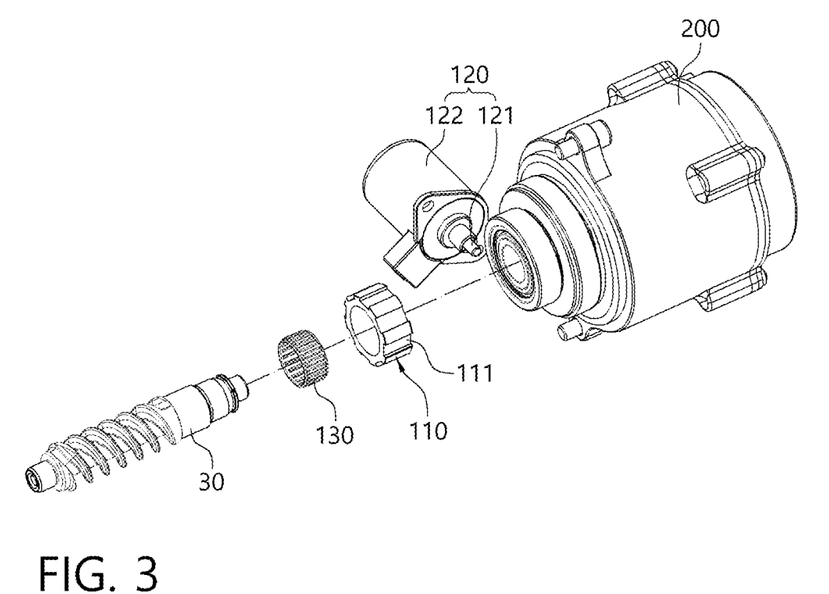
FIG. 3 is an exploded perspective view illustrating a worm shaft, a locking portion, and an actuator of the steer-by-wire steering apparatus according to the first embodiment of the present disclosure.

Referring to FIGS. 1 to 3, a steer-by-wire steering apparatus according to the first embodiment of the present disclosure includes a locking portion 100, an actuator 200, and a control portion (not shown).

The locking portion 100 restricts rotation of a shaft which transfers a steering force or a steering reaction. In the first embodiment of the present disclosure, the locking portion 100 restricts rotation of a worm shaft 30 which provides a steering reaction to a worm wheel 21 coupled to the steering shaft 20. The locking portion 100 includes a locking ring 110, a locking unit 120, and a fastening unit 130.

Here, the worm shaft 30 is disposed inside a worm housing (not shown). One end of the worm shaft 30 is connected to the actuator 200, and the other end of the worm shaft 30 is coupled with a bearing 31 disposed inside the worm housing. Also, a gap preventing unit 33 which pressurizes the worm shaft 30 to the worm wheel 21 to prevent a gap between the worm shaft 30 and the worm wheel 21 may be additionally disposed. In FIG. 2, the gap preventing unit 33 is disposed to compensate for the gap between the worm shaft 30 and the worm wheel 21 by pressurizing the bearing 31.

The locking ring 110 includes a locking groove 111 formed on an outer circumferential surface thereof and is disposed on a shaft which provides a steering force or a steering reaction. A plurality of such locking grooves 111 may be formed at certain intervals on the outer circumferential surface of the locking ring 110. In the first embodiment of the present disclosure, the locking ring 110 is disposed on the worm shaft 30. The locking ring 110 is coupled with the worm shaft 30 by a fastening force provided by the fastening unit 130.

The locking unit 120 includes a locking bar 121 which is inserted into the locking groove 111 and restricts rotation of the worm shaft 30 in certain conditions. The locking bar 121 may be coupled with a solenoid 122 and may be inserted into or withdrawn from the locking groove 111 according to an operation of the solenoid 122. Here, the certain conditions may include a state in which a vehicle stalls, a state in which an obstacle is stuck under a wheel while driving, a state in which a reaction greater than or equal to 20 Nm is necessary, and the like.

In a case corresponding to the above certain conditions, the solenoid 122 inserts the locking bar 121 into the locking groove 111. As a result, the rotation of the worm shaft 30 is mechanically restricted and rotation of the steering shaft 20 connected to the worm shaft 30 through the worm wheel 21 is also restricted. Here, the solenoid 122 may be controlled by the electronic control unit.

The fastening unit 130 is disposed between the worm shaft 30 and the locking ring 110 and provides a fastening force between the locking ring 110 and the worm shaft 30. The fastening unit 130 may be formed as an elastic member disposed between an outer circumferential surface of the worm shaft 30 and an inner circumferential surface of the locking ring 110. In more detail, the elastic member may have a ring shape. For example, the fastening unit 130 may be formed as a tolerance ring.

The actuator 200 may generate torque capable of overcoming a rotation-disabled state of the worm shaft 30. Also, at the same time, the actuator 200 generates and provides a steering reaction to the shaft while the vehicle is running. For example, the actuator 200 may be formed as a motor which generates a steering reaction.

That is, in the first embodiment of the present disclosure, the actuator 200 drives the worm shaft 30 to rotate under the control of the electronic control unit while the vehicle is running. The actuator 200 generates torque for generating an adequate steering reaction under the control of the electronic control unit based on a steering wheel, steering torque, and the like of the steering wheel 10, and the worm shaft 30 rotates while engaged with the worm wheel 21 coupled to the steering shaft 20 and provides the steering shaft 20 with the steering reaction.

When corresponding to the certain conditions, since the rotation of the worm shaft 30 is restricted by the locking portion 100, the rotation of the steering shaft 20 engaged with the worm shaft 30 through the worm wheel 21 is restricted. However, when the rotation of the worm shaft 30 is restricted by the locking portion 100 despite not corresponding to the certain conditions, the steering shaft 20 is locked and disabled to perform steering and it is very dangerous. In this situation, the actuator 200 generates torque capable of the rotation-restricted state of the worm shaft 30 under the control of the control portion.

Figure 4:
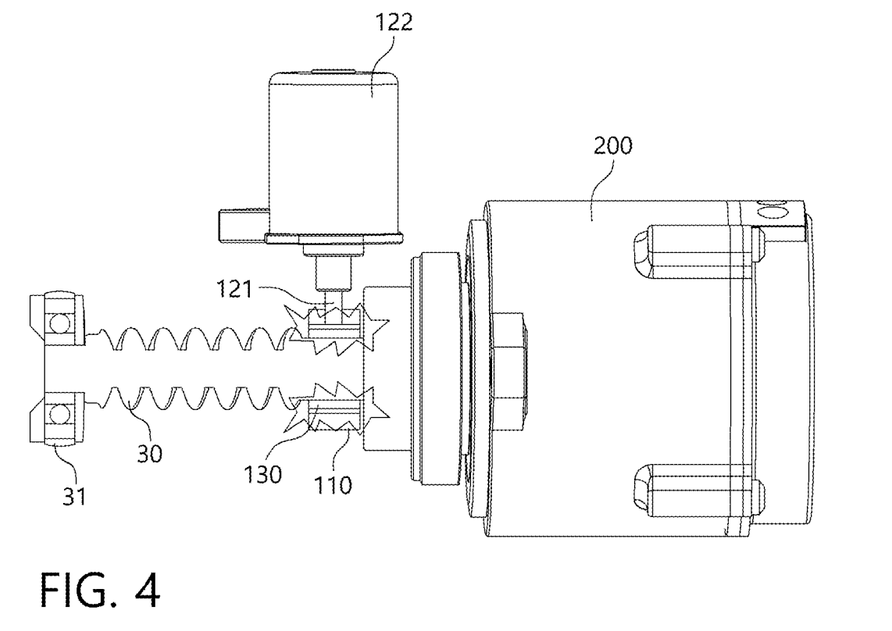
FIG. 4 is a view illustrating the steer-by-wire steering apparatus in operation according to a first embodiment of the present disclosure.

In more detail, when it is determined that the rotation of the shaft is restricted by a malfunction of the locking portion 100 despite not corresponding to the certain conditions, the actuator 200 may generate torque greater than the fastening force of the fastening unit 130 disposed between the locking ring 110 and the worm shaft 30. As a result, as shown in FIG. 4, as fastening between the fastening unit 130 and the locking ring 110 is released, even while the locking bar 121 is inserted into the locking groove 111 of the locking ring 110, the worm shaft 30 may rotate such that the steering shaft 20 may also rotate. Also, in addition, an adequate steering reaction may be continuously provided to the steering shaft 20. As described above, the actuator 200 increases safety by generating torque capable of overcoming the rotation-disabled state of the worm shaft 30 in an emergency situation.

The control portion determines whether the rotation of the shaft which transfers a steering force or a steering reaction is restricted by a malfunction of the locking portion 100. When it is determined that the restriction is caused by the malfunction, the control portion controls the actuator 200 to generate torque capable of overcoming a rotation-restricted state of the shaft.

The control portion may be implemented to be integrated with the electronic control unit and may be included as a part thereof. Also, the control portion may be configured as a control unit separate from the electronic control unit.

In the first embodiment of the present disclosure, the control portion determines whether the rotation of the worm shaft 30 is restricted by a malfunction of the locking portion 100 and controls the actuator 200 to generate and provide torque capable of overcoming a rotation-restricted state of the worm shaft 30 to the worm shaft 30 when it is determined that the restriction is caused by the malfunction.

A case in which the rotation of the worm shaft 30 is restricted by the malfunction of the locking portion 100 means a case in which the rotation of the worm shaft 30 is restricted by the locking portion 100 even when the vehicle is running in conditions not corresponding to the certain conditions. As described above, since this is a situation in which it is impossible to perform steering while a vehicle is running, a probability of the situation leading to an accident is high. In the first embodiment of the present disclosure, when such a danger is sensed, the control portion controls the actuator 200 to generate torque capable of overcoming the fastening force between the worm shaft 30 and the locking ring 110 provided by the fastening unit 130 so as to allow the worm shaft 30 to rotate.

Figure 5:
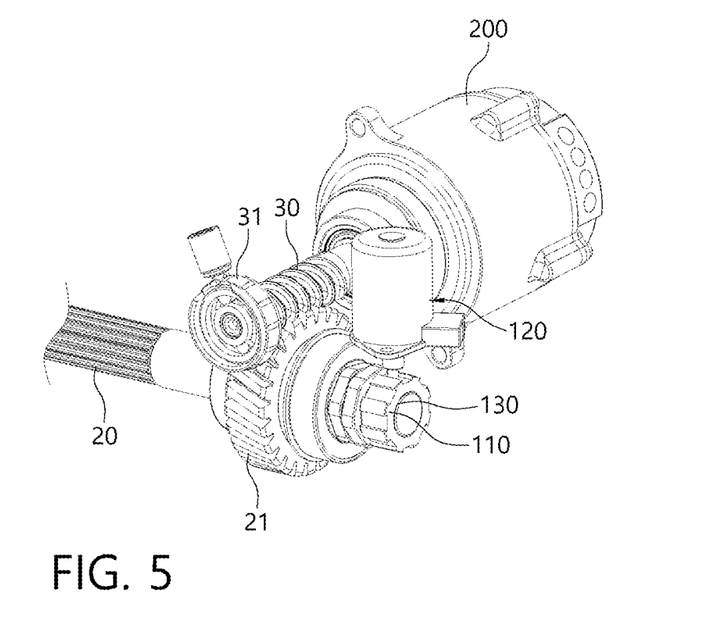
FIG. 5 is a perspective view of a steer-by-wire steering apparatus according to a second embodiment of the present disclosure.

FIG. 5 is a perspective view of a steer-by-wire steering apparatus according to a second embodiment of the present disclosure. Also, FIG. 6 is an exploded perspective view of the steer-by-wire steering apparatus according to the second embodiment of the present disclosure.

Figure 6:
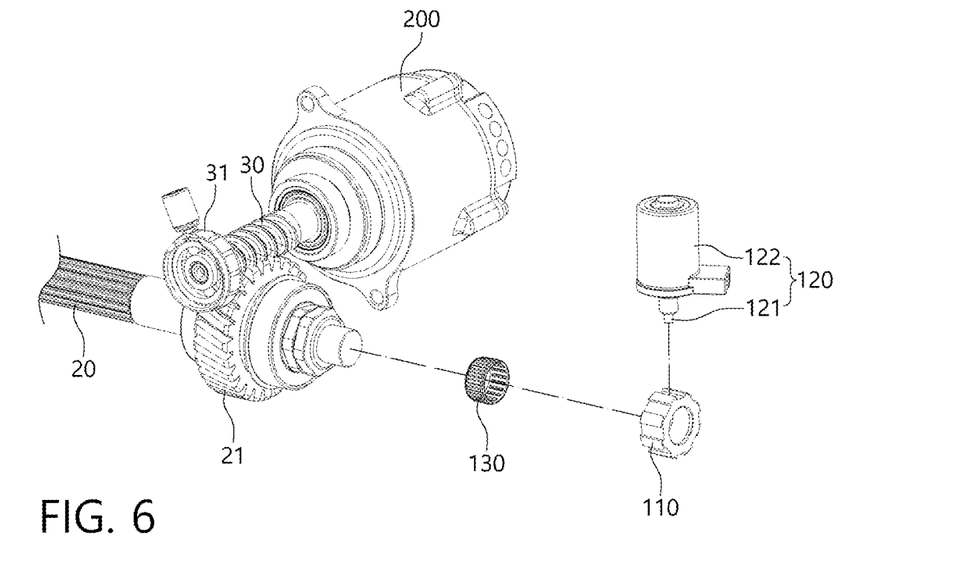
FIG. 6 is an exploded perspective view of the steer-by-wire steering apparatus according to the second embodiment of the present disclosure.

Referring to FIGS. 5 and 6, the steer-by-wire steering apparatus according to the second embodiment of the present disclosure has a difference in that the locking portion 100 is coupled with the steering shaft 20 in comparison to the first embodiment of the present disclosure.

That is, in the second embodiment of the present disclosure, the locking portion 100 directly restricts rotation of the steering shaft 20. The locking ring 110 is coupled with the steering shaft 20, and the locking bar 121 of the locking unit 120 is inserted into the locking groove 111 of the locking ring 110 coupled with the steering shaft 20 according to an operation of the solenoid 122 in certain conditions. Also, the fastening unit 130 provides a fastening force between the locking ring 110 and the steering shaft 20.

Here, the fastening unit 130 may be formed as an elastic member disposed between an outer circumferential surface of the steering shaft 20 and the inner circumferential surface of the locking ring 110. As described above in relation to the first embodiment of the present disclosure, the elastic member may have a ring shape and, in more detail, may be formed as a tolerance ring.

Meanwhile, the actuator 200 may generate torque capable of overcoming a rotation-disabled state of the steering shaft 20. The control portion determines whether the rotation of the steering shaft 20 is restricted by a malfunction of the locking portion 100 and controls the actuator 200 to generate and provide torque capable of overcoming a rotation-restricted state of the steering shaft 20 to the steering shaft 20 when it is determined that the restriction is caused by the malfunction.

Figure 7:
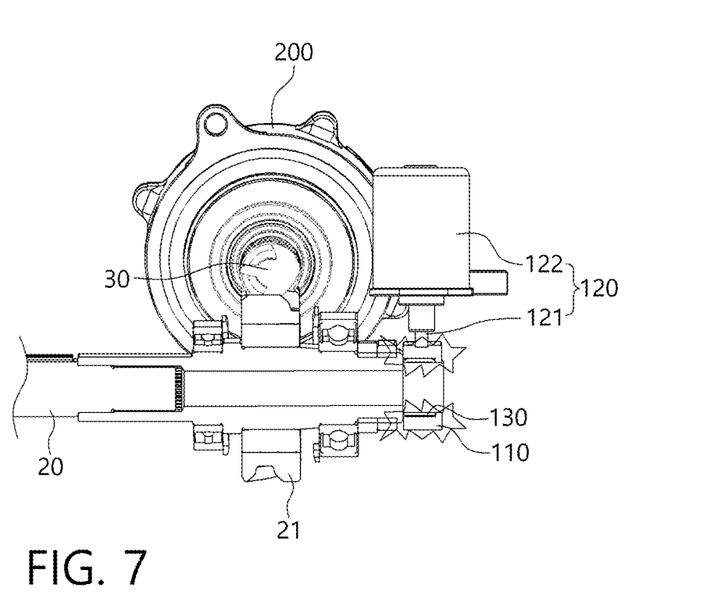
FIG. 7 is a view illustrating the steer-by-wire steering apparatus in operation according to a first embodiment of the present disclosure.

Accordingly, when the rotation of the steering shaft 20 is restricted by the malfunction of the locking portion 100, as shown in FIG. 7, under the control of the control portion, the actuator 200 generates and transfers torque greater than a fastening force between the locking ring 110 and the steering shaft 20 provided by the fastening unit 130 to the worm wheel 21 of the steering shaft 20 through the worm shaft 30 to prevent a steering-disabled state.

Figure 8:
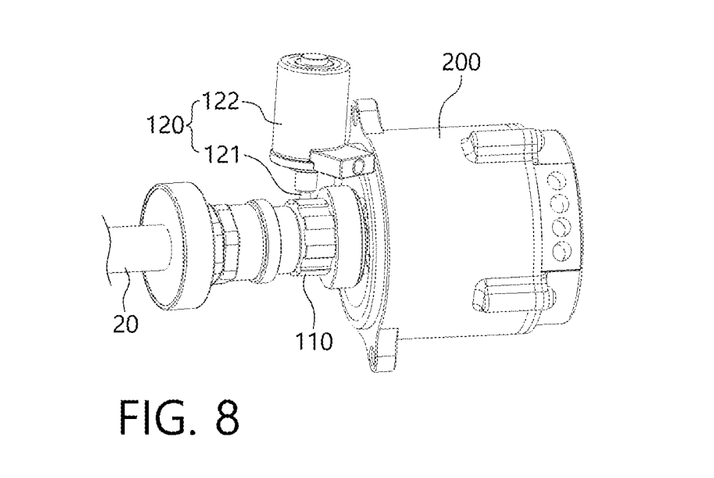
FIG. 8 is a perspective view of a steer-by-wire steering apparatus according to a third embodiment of the present disclosure.

FIG. 8 is a perspective view of a steer-by-wire steering apparatus according to a third embodiment of the present disclosure. Also, FIG. 9 is an exploded perspective view of the steer-by-wire steering apparatus according to the third embodiment of the present disclosure.

Figure 9:
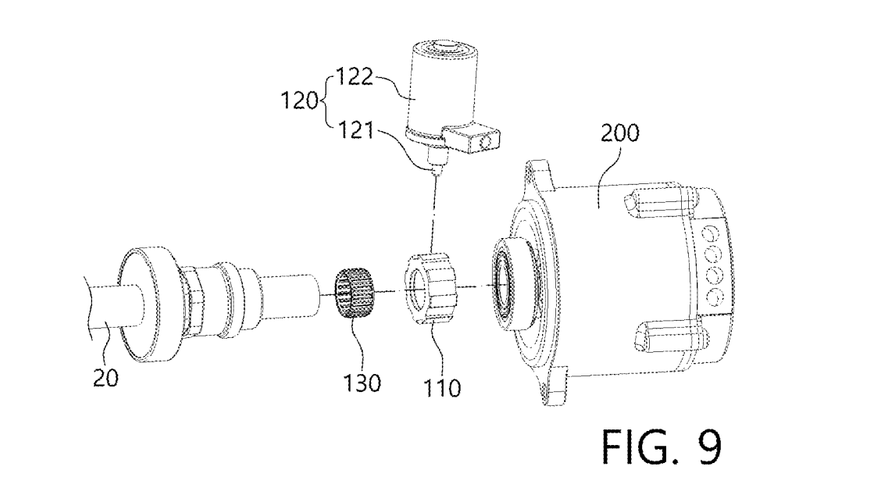
FIG. 9 is an exploded perspective view of the steer-by-wire steering apparatus according to the third embodiment of the present disclosure.

Referring to FIGS. 8 and 9, the steer-by-wire steering apparatus according to the third embodiment of the present disclosure has a difference in that the actuator 200 is directly coupled with the steering shaft 20 in comparison to the first embodiment and the second embodiment of the present disclosure.

In the third embodiment of the present disclosure, the locking portion 100 is coupled with the steering shaft 20. As described above, the fastening unit 130 may be formed as an elastic member disposed between the outer circumferential surface of the steering shaft 20 and the inner circumferential surface of the locking ring 110. Also, the elastic member may have a ring shape, and in more detail, may be formed as a tolerance ring.

In the third embodiment of the present disclosure, the control portion determines whether the rotation of the steering shaft 20 is restricted by a malfunction of the locking portion 100 and controls the actuator 200 to generate and provide torque capable of overcoming a rotation-restricted state of the steering shaft 20 to the steering shaft 20 when it is determined that the restriction is caused by the malfunction.

Accordingly, the actuator 200 generates and provides torque greater than a fastening force between the locking ring 110 and the steering shaft 20 provided by the fastening unit 130 to the steering shaft 20 so as to prevent a steering-disabled state while a vehicle is running Here, since the actuator 200 is coupled to the steering shaft 20, the actuator 200 may directly transfer the generated torque to the steering shaft 20.

Meanwhile, like the above embodiments, in the third embodiment of the present disclosure, the actuator 200 may provide the steering shaft 20 with torque for a steering reaction under the control of the electronic control unit while the vehicle is running. That is, the actuator 200 provides the steering reaction while the vehicle is running in conditions not corresponding to the certain conditions. Here, the actuator 200 may be directly coupled to the steering shaft 20 and may provide the steering reaction thereto instead of providing the steering reaction through the worm shaft 30 and the worm wheel 21.

Figure 10:
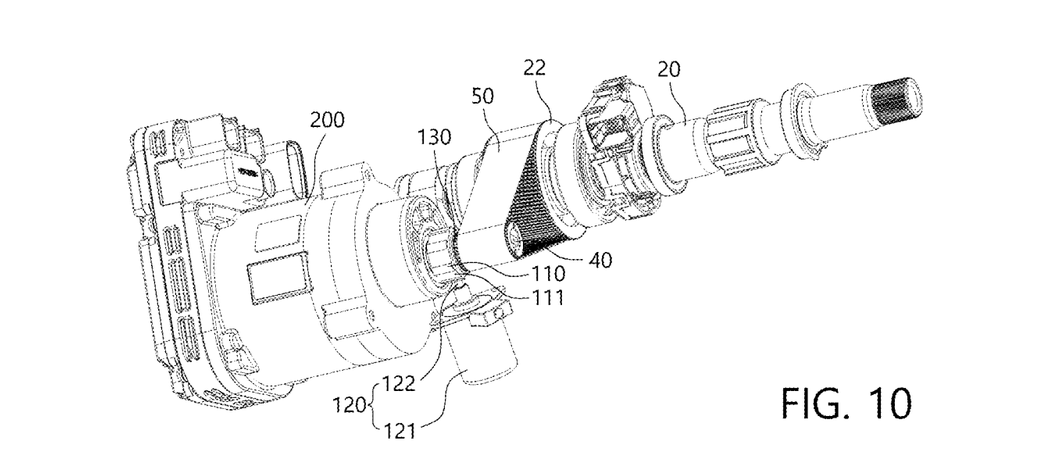
FIG. 10 is a perspective view of a steer-by-wire steering apparatus according to a fourth embodiment of the present disclosure.

FIG. 10 is a perspective view of a steer-by-wire steering apparatus according to a fourth embodiment of the present disclosure.

Referring to FIG. 10, in the fourth embodiment of the present disclosure, a driven pulley 22 is coupled to the steering shaft 20. The actuator 200 generates torque for a steering reaction while a vehicle is running, and the torque generated by the actuator 200 is transferred to the driven pulley 22 through a driving pulley shaft 40 and a belt 50. The torque transferred to the driven pulley 22 provides the steering shaft 20 with the steering reaction.

In the fourth embodiment of the present disclosure, the locking portion 100 restricts rotation of the driving pulley shaft 40 which provides a steering reaction to the driven pulley 22 coupled to the steering shaft 20. In detail, the locking ring 110 including the locking grooves 111 formed on the outer circumferential surface thereof is coupled to the driving pulley shaft 40. The locking bar 121 of the locking unit 120 is inserted into the locking groove 111 according to an operation of the solenoid 122 and restricts rotation of the driving pulley shaft 40 in certain conditions. The fastening unit 130 is disposed between the driving pulley shaft 40 and the locking ring 110 and provides a fastening force between the locking ring 110 and the driving pulley shaft 40.

The control portion determines whether the rotation of the driving pulley shaft 40 is restricted by a malfunction of the locking portion 100 and controls the actuator 200 to generate torque capable of overcoming a rotation-restricted state of the driving pulley shaft 40 when it is determined the restriction is caused by the malfunction.

According to one embodiment of the present disclosure, in a steer-by-wire steering apparatus, when rotation of a shaft transferring a steering force or a steering reaction is restricted by a malfunction of a locking portion, torque capable of overcoming a rotation-restricted state of the shaft is generated by an actuator and provided to the shaft such that it is possible to prevent a steering-disabled state from occurring while a vehicle is running.

Also, according to one embodiment of the present disclosure, in the steer-by-wire steering apparatus, even when the rotation of the shaft transferring the steering force or steering reaction is restricted by the malfunction of the locking portion, not only steering may be continuously performed but also an adequate reaction sense may be provided.

It should be understood that the effects of the present disclosure are not limited to the above effects and include all effects derivable from the detailed description or the components disclosed in the claims.

As discussed in the foregoing, although all the elements forming the exemplary embodiments of the present disclosure are combined into one or operated as one element, the present disclosure is not limited thereto. That is, all the elements may be selectively combined or operated if within an object scope of the present disclosure. Furthermore, it will be understood that the terms "includes" and/or "including", "forming" and/or "formed" when used in this specification, specify the presence of stated features, regions, integers, steps, operations, elements, and/or components, but do not preclude the presence or addition of one or more other features, regions, integers, steps, operations, elements, components, and/or groups thereof.

What is claimed is:

1. A steer-by-wire steering apparatus of a vehicle, comprising:
 a control portion configured to determine whether the rotation of the shaft is restricted
 an actuator configured to generate and provide a steering reaction to a steering shaft through an output shaft while the vehicle is running;
 a locking portion configured to restrict rotation of the output shaft in certain conditions; and
 a control portion configured to determine whether the rotation of the output shaft is restricted by a malfunction of the locking portion even though the rotation of the output shaft does not correspond to the certain conditions and controls the actuator to generate and provide the torque capable of overcoming the rotation-restricted state of the output shaft to the output shaft when it is determined that the restriction is caused by the malfunction,
 wherein the locking portion comprises:
 a locking ring comprising a locking groove on an outer circumferential surface of the locking ring, the locking ring disposed on the output shaft;
 a locking unit comprising a locking bar inserted into the locking groove and configured to restrict the rotation of the output shaft in the certain conditions; and
 a fastening unit disposed between the output shaft and the locking ring and configured to provide a fastening force between the locking ring and the output shaft, the fastening unit having elastic material disposed between an outer circumferential surface of the output shaft and an inner circumferential surface of the locking ring.

2. The steer-by-wire steering apparatus of claim 1, wherein
 the output shaft is a worm shaft configured to transfer the steering reaction to a worm wheel coupled to the steering shaft.

3. The steer-by-wire steering apparatus of claim 1, wherein
 the output shaft is a driving pulley shaft to which a driving pulley transferring a steering reaction to a driven pulley coupled to the steering shaft through a belt is coupled.

4. The steer-by-wire steering apparatus of claim 1, wherein the fastening unit has a ring shape.

5. The steer-by-wire steering apparatus of claim 1, wherein the locking unit further comprises a solenoid coupled with the locking bar and inserting or withdrawing the locking bar into or from the locking groove.

6. The steer-by-wire steering apparatus of claim 1, wherein the certain conditions comprise a state in which a vehicle stalls, a state in which an obstacle is stuck under a wheel while driving, a state in which a reaction greater than or equal to 20 Nm is necessary.

\* \* \* \* \*